US008551220B2

(12) United States Patent
Jung et al.

(10) Patent No.: US 8,551,220 B2
(45) Date of Patent: Oct. 8, 2013

(54) SULFUR DIOXIDE ABSORBENT COMPRISING IONIC LIQUID

(75) Inventors: Kwang Deog Jung, Seoul (KR); Hong Gon Kim, Seoul (KR); Chang Soo Kim, Daegu (KR); Hoon Sik Kim, Seoul (KR); Minserk Cheong, Seoul (KR); Sung Yun Hong, Goyang-si (KR)

(73) Assignee: Korea Institute of Science and Technology, Seoul (KR)

( * ) Notice: Subject to any disclaimer, the term of this patent is extended or adjusted under 35 U.S.C. 154(b) by 91 days.

(21) Appl. No.: 13/090,377

(22) Filed: Apr. 20, 2011

(65) Prior Publication Data
US 2012/0042778 A1 Feb. 23, 2012

(30) Foreign Application Priority Data

Aug. 19, 2010 (KR) .................. 10-2010-0080228

(51) Int. Cl.
*B01D 53/14* (2006.01)
(52) U.S. Cl.
USPC .................. 95/181; 95/235; 252/60; 252/184

(58) Field of Classification Search
USPC ........................................... 95/235
See application file for complete search history.

(56) References Cited

U.S. PATENT DOCUMENTS

| 7,553,406 | B2 * | 6/2009 | Wasserscheid et al. | 208/236 |
| 2002/0189444 | A1 * | 12/2002 | Brennecke et al. | 95/45 |
| 2003/0085156 | A1 * | 5/2003 | Schoonover | 208/230 |

OTHER PUBLICATIONS

Washburn, E.W. (1926-1930;2003). International Critical Tables of Numerical Data, Physics, Chemistry and Technology (1st Electronic Edition).. Knovel. Online version available at: http://www.knovel.com/web/portal/browse/display?_EXT_KNOVEL_DISPLAY_bookid=735&VerticalID=0.*

* cited by examiner

*Primary Examiner* — Duane Smith
*Assistant Examiner* — Joubert X Glover
(74) *Attorney, Agent, or Firm* — Ladas & Parry LLP

(57) ABSTRACT

A sulfur dioxide absorbent comprising an ionic liquid comprised of alkyl ether-substituted imidazolium cation and an alkanesulfonate anion moieties possesses a high thermal/chemical stability, high $SO_2$ absorption rate and low regeneration temperature, and is useful for an effective separation of $SO_2$ from a combustion exhaust gas mixture or the like.

7 Claims, 1 Drawing Sheet

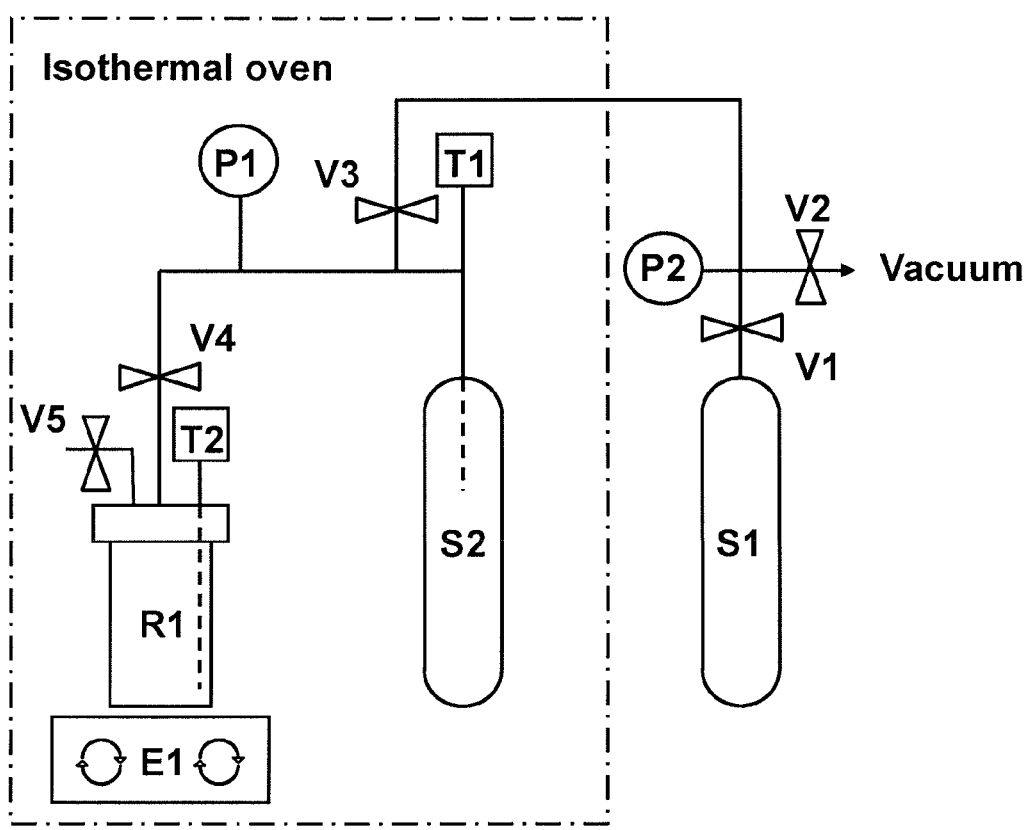

SULFUR DIOXIDE ABSORBENT COMPRISING IONIC LIQUID

FIELD OF THE INVENTION

The present invention relates to an absorbent for removing sulfur dioxide ($SO_2$) from a gaseous mixture such as combustion exhaust gas mixture and the like; and, more particularly, to a sulfur dioxide absorbent comprising an ionic liquid which has a very low vapor pressure, high thermal/chemical stability and excellent performance characteristics in reversible absorption of $SO_2$.

BACKGROUND OF THE INVENTION

Various methods that are based on absorption, adsorption, membrane, and cryogenics technologies have been in use for removing environmentally harmful gases such as CO, $CO_2$, $SO_2$ and $N_2O$ emitted from, e.g., chemical plants, power plants, and large-scale boilers. The absorption or adsorption method, in particular, has been used for selective separation and removal of relatively low concentrations of noxious gases. However, chemical absorbents or adsorbents used for such purposes tend to deteriorate with the processing time, thereby requiring their replacement on a regular basis. A solid adsorbent, which is normally more resistant to chemical degradation, might be more suitable for such a process. Notwithstanding such apparent advantage, however, use of a liquid absorbent, instead of a solid adsorbent, has been preferred in the purification/separation of large quantities of, e.g., exhaust gas mixture due to the former's relative ease of replacement and handling.

For instance, amine-based compounds have been extensively used as sulfur dioxide ($SO_2$) absorbents. Representatives of such amine-based compounds include triethanol amine disclosed in U.S. Pat. No. 3,904,735, monoethanol amine disclosed in U.S. Pat. No. 4,201,752, and diethanol amine disclosed in U.S. Pat. No. 2,404,854. Use of an amine-based $SO_2$ absorbent typically involves an absorption step wherein $SO_2$ molecules and the absorbent form a chemical bonding, followed by a regeneration step to recover the bound $SO_2$ by way of, e.g., thermal treatment. However, such amine-based $SO_2$ absorbents have severe drawbacks in that the regeneration step must be carried out at a high temperature due to the relatively strong chemical bond between $SO_2$ and the amine, which may cause an irreversible decomposition of the amine, which may, in turn, cause reduction in absorption capacity, corrosion of the absorption apparatus due to the amine or decomposition by-products thereof, and contamination of the recovered $SO_2$ gas by such decomposition by-products.

In order to overcome the afore-mentioned drawbacks, therefore, an ionic liquid-based absorbent has been recently developed. For example, U.S. Pat. Nos. 6,849,774 and 6,623,659, and US Patent Publication No. 2008-0146849 propose the use of an ionic liquid-based absorbent which has negligible volatility and high thermally/chemically stability. Ionic liquid is a polar salt composed of an organic cation moiety and an organic/inorganic anion moiety, and has a high absorption capacity for polar gases such as CO, $CO_2$, $SO_2$, and $N_2O$. Since gas absorption in an ionic liquid depends on the interaction between a gas and the ionic liquid, the absorption capacity for the target gas can be adjusted to a certain extent by tailoring the polarity, acidity, basicity, or nucleophilicity of the ionic liquid by way of varying the types of cation and anion moieties in the ionic liquid.

It has been disclosed [*Angew. Chem., Int. Ed.*, 2004, 43, 2415-2417] that an $SO_2$ absorbent comprising an ionic liquid of 1,1,3,3-tetramethylguanidinium lactate ([TMG]L) absorbs 0.978 mole of $SO_2$ per mole of the ionic liquid. Korean Patent No. 10-0831093 discloses that 1-butyl-3-methylimidazolium chloride ([BMIm]Cl) absorbs 1.68 mole of $SO_2$ per mole of the ionic liquid, while 1-ethyl-3-methylimidazolium ethylsulfate ([EMIm]EtSO_4) absorbs 0.92 mole of $SO_2$ per mole of the ionic liquid. Further, Korean Patent Publication No. 2010-0043796 describes that a fluorine-containing ionic liquid, 1-butyl-3-hexafluoropropyl imidazolium trifluoroacetate ([BhFpIm]$CF_3CO_2$), which is highly stable against heat and $SO_2$-induced degradation, absorbs 0.48 mole of $SO_2$ per 1 mole of the ionic liquid.

However, ionic liquid absorbents reported in the prior arts still possess several drawbacks. For instance, in case of an ionic liquid absorbent containing fluorinated anion such as tetrafluoroborate ($BF_4$), the fluorine moiety can be easily hydrolyzed to generate hydrogen fluoride, thereby causing the loss of the absorbent. In case of an ionic liquid with Cl⁻ anion, it exists as a solid at a room temperature and, therefore, during an absorption process, it must be maintained at a relatively high temperature so as to keep the absorbent in a liquid state.

SUMMARY OF THE INVENTION

Accordingly, it is an object of the present invention to provide a novel sulfur dioxide absorbent comprising an ionic liquid which has a very low vapor pressure, excellent thermal/chemical stability, and high $SO_2$ absorption capacity as well as easy regenerability at a low recycling temperature for easy stripping of the absorbed $SO_2$.

It is another object of the present invention to provide a method for separating and recovering sulfur dioxide by using the sulfur dioxide absorbent.

In accordance with one aspect of the present invention, there is provided a sulfur dioxide absorbent comprising an ionic liquid of formula (I):

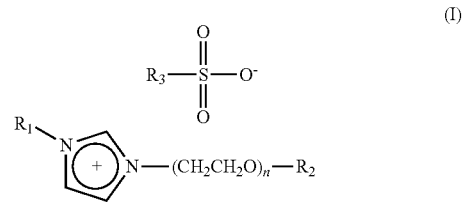

wherein $R_1$ to $R_3$ are each independently $C_{1-8}$ alkyl, and n is an integer ranging from 1 to 8. Preferably, $R_1$ to $R_3$ are each independently $C_{1-4}$ alkyl.

In accordance with another aspect of the present invention, there is provided a method for separating and recovering sulfur dioxide, comprising the steps of: (a) contacting a gaseous mixture containing $SO_2$ to the ionic liquid absorbent so as to selectively absorb said $SO_2$ from the gaseous mixture; and (b) stripping said $SO_2$ absorbed in the ionic liquid absorbent by a heat treatment.

The sulfur dioxide absorbent of the present invention has a high thermal/chemical stability and easy regenerability at a relatively low recycling temperature for easy stripping of the absorbed $SO_2$. Further, the ionic liquid absorbent of the present invention maintains excellent performance characteristics in reversible absorption of $SO_2$ without losing the initial absorption capacity, which is higher than conventional amine-based sulfur dioxide absorbents.

Further, when compared with conventional amine-based absorbents, the inventive absorbent is advantageous in terms of its negligible vapor pressure and low corrosivity, thereby enabling the recycling process to be carried out with markedly low energy, and the recovery of $SO_2$ having a very high purity substantially free of contamination caused by decomposition products.

BRIEF DESCRIPTION OF THE DRAWINGS

The above and other objects and features of the present invention will become apparent from the following description of the invention, when taken in conjunction with the accompanying drawing, FIG. 1, which shows a schematic diagram of an apparatus for absorbing and stripping $SO_2$, wherein S1 is an $SO_2$ supply tank, S2 is an $SO_2$ storage cylinder, R1 is an absorption reactor, P1 is a high pressure transducer, P2 is a pressure transducer, T1 and T2 are thermocouples connected to temperature controllers, V1 to V5 are valves, and E1 is a stirrer.

DETAILED DESCRIPTION OF THE INVENTION

The term "alkyl" used herein means a linear or branched $C_1$ to $C_8$ saturated hydrocarbon radical chain. For example, the term "alkyl" comprises methyl, ethyl, n-propyl, isopropyl, n-butyl, isobutyl, t-butyl, n-pentyl, isopentyl, hexyl, heptyl and octyl, but not limited thereto.

According to a preferred embodiment of the present invention, alkyl is $C_{1-4}$ alkyl.

Although a conventional amine-based absorbent has a high absorption capacity for sulfur dioxide, its strong complexation with sulfur dioxide tends to cause decomposition of the absorbent during $SO_2$-stripping so that the recovered $SO_2$ gas may be contaminated by such decomposition products, and, further, in the process of cleaving the strong chemical bond between amine and $SO_2$, an irreversible decomposition of the amine may occur.

In order to overcome these problems of the amine-based sulfur dioxide absorbent, there have been attempts to develop a sulfur dioxide absorbent comprising an ionic liquid, among the salts composed of a cation containing nitrogen or phosphorus, and an anion such as $AlCl^-$, $BF_4^-$, $PF_6^-$, $(CF_3SO)_2N^-$, $CF_3SO_3^-$, $NO_3^-$, $CF_3CO_2^-$ and $CH_3CO_2^-$. However, these ionic liquids possess the problems that they are too expensive for general use and are easily decomposed by moisture, and have low $SO_2$ absorption capabilities. Moreover, some of the ionic liquids form very strong chemical bonds with $SO_2$, thereby causing the $SO_2$-stripping to be carried out at a high temperature and rendering it difficult to recover $SO_2$.

Accordingly, the present inventors have endeavored and succeeded to develop a room temperature ionic liquid (RTIL) comprising an alkyl ether-substituted imidazolium cation and an alkanesulfonate anion, which has a high $SO_2$ absorption capacity, good thermal/chemical stability and easy regenerability at a low recycling temperature for easy $SO_2$-stripping.

Accordingly, in accordance with an embodiment of the present invention, there is provided a sulfur dioxide absorbent comprising an ionic liquid of formula (I):

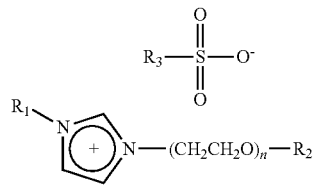

(I)

wherein $R_1$ to $R_3$ are each independently $C_{1-8}$ alkyl, and n is an integer ranging from 1 to 8.

In particular, the ionic liquid may be selected from the group consisting of 1-triethylene glycol monomethyl ether-3-methylimidazolium methanesulfonate ([E$_3$GMEMIm]MeSO$_3$), 1-ethylene glycol monomethyl ether-3-methylimidazolium methanesulfonate ([EGMEMIm]MeSO$_3$), 1-diethylene glycol monomethyl ether-3-methylimidazolium methanesulfonate ([E$_2$GMEMIm]MeSO$_3$), 1-tetraethylene glycol monomethyl ether-3-methylimidazolium methanesulfonate ([E$_4$GMEMIm]MeSO$_3$), 1-hexaethylene glycol monomethyl ether-3-methylimidazolium methanesulfonate [E$_6$GMEMIm]MeSO$_3$), 1-octaethylene glycol monomethyl ether-3-methylimidazolium methanesulfonate ([E$_8$GMEMIm]MeSO$_3$), and a mixture thereof.

The ionic liquid may be prepared by reacting an 1-alkylimidazole of formula (II) with an alkyl ether alkanesulfonate of formula (III):

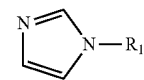

(II)

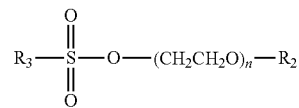

(III)

wherein $R_1$ to $R_3$ and n are the same as defined above.

Examples of the 1-alkylimidazole of formula (II) include 1-methylimidazole, 1-ethylimidazole, 1-butylimidazole, and 1-hexylimidazole. Examples of the alkyl ether alkanesulfonate of formula (III) include ethylene glycol monomethyl ether methanesulfonate, diethylene glycol monomethyl ether methanesulfonate, triethylene glycol monomethyl ether methanesulfonate, tetraethylene glycol monomethyl ether methanesulfonate, hexaethylene glycol monomethyl ether methanesulfonate, and octaethylene glycol monomethyl ether methanesulfonate.

In the above reaction, the alkyl ether alkanesulfonate of formula (III) may be used in an amount of 0.9 to 1.1 mole per 1 mole of the 1-alkylimidazole of formula (II).

The ether-functionalized imidazolium alkanesulfonate ionic liquid of formula (I) obtained by the above reaction may exist as a liquid at a room temperature.

In accordance with another aspect of the present invention, there is provided a method for separating and recovering sulfur dioxide comprising the steps of: (a) contacting a gaseous mixture containing $SO_2$ to the ionic liquid absorbent for the selective absorption of said $SO_2$ from the gaseous mixture; and (b) stripping of absorbed $SO_2$ in the absorbent by a thermal treatment.

FIG. 1 is a schematic diagram of an apparatus for absorbing and stripping $SO_2$ using an ionic liquid.

Referring to FIG. 1, the apparatus for absorbing and recovering $SO_2$ may comprise an absorption reactor (R1) equipped with a thermocouple (T2), a high pressure (0 to 7 atm) transducer (P1), a thermocouple (T1), an $SO_2$ storage cylinder (S2) equipped with a pressure transducer (P2), and a stirrer (E1).

Preferably, the $SO_2$ absorption at a constant temperature is measured in an isothermal oven. A measured amount of the $SO_2$ absorbent is loaded into the absorption reactor (R1) shown in FIG. 1 together with a magnet bar and then the absorbent is vacuum dried while stirring at 50 to 80° C. for about 1 hour. The absorption reactor (R1) is sealed by closing the valve (V4), the $SO_2$ storage cylinder (S2) is filled with $SO_2$, and then an equilibrium pressure and temperature (the initial values) are recorded. Next, the valve (V4) connected to the absorption reactor (R1) is opened, and then the pressure and temperature at equilibrium are recorded. The reaction mixture is further stirred for about 30 minutes, and then the final pressure and temperature are recorded (the equilibrium values). After the $SO_2$ absorption, the pressure is reduced by opening the valve (V5), the temperature is raised to 50 to 150° C. and then $SO_2$-stripping is conducted by flowing $N_2$ into the absorption reactor, e.g., at a rate of 10 to 20 mL/min.

The stripping of $SO_2$ absorbed in the inventive absorbent can be carried out at a lower temperature than that employed in a conventional $SO_2$-stripping process using an amine-based $SO_2$ absorbent. Amine-based absorbents form strong chemical bonds with $SO_2$ whereas the inventive absorbent physically interacts with $SO_2$, which allows an easy stripping of $SO_2$ from the absorbent. Further, the $SO_2$ absorbent of the present invention is superior to conventional organic solvent-based $SO_2$ absorbents thanks to the former's higher $SO_2$ absorption capacity. Accordingly, it is possible to design a high-efficiency compact absorption apparatus by using the inventive absorbent. Moreover, the $SO_2$ absorbent of the present invention has much lower hydrocarbon absorption capacity than organic solvent-based $SO_2$ absorbents, thereby allowing selective removal of $SO_2$ from a hydrocarbon mixture.

The sulfur dioxide absorbent of the present invention has a negligible vapor pressure and a high chemical stability, preventing the loss or decomposition of the absorbent.

The $SO_2$ absorption using the inventive absorbent may be conducted at a temperature of 20 to 80° C., preferably 30 to 50° C. When the absorption temperature is lower than 20° C., a small amount of free $SO_2$ may exist in a liquid phase, and when the absorption temperature is higher than 80° C., the $SO_2$ absorption capacity may be lowered because the absorption and stripping of $SO_2$ may occur concurrently.

The absorption pressure may be in the range of 0 to 5 atm, preferably atmospheric pressure to 3 atm, since the vapor pressure of $SO_2$ is 3.44 atm at 21° C.

The $SO_2$ stripping process may be carried out at a temperature ranging from 50 to 150° C., preferably 70 to 100° C. When the stripping temperature is lower than 50° C., the stripping rate becomes too low, and when the stripping temperature is higher than 150° C., the chance of ionic liquid decomposition may increase.

As the absorption temperature decreases or the absorption pressure increases, the $SO_2$ absorption capacity increases. Particularly, the $SO_2$ absorption capacity increases linearly with the pressure.

The sulfur dioxide absorbent of the present invention maintains a high $SO_2$ absorption capacity even under a low pressure and maintains its initial absorption capacity even after repeated uses. For example, the sulfur dioxide absorbent of the present invention shows only a slight reduction in the $SO_2$ absorption capacity, i.e., less than 2% of the initial capacity after 5 recycles.

As described above, the sulfur dioxide absorbent of the present invention has high thermal/chemical stability, high $SO_2$ absorption capacity, and easy regenerability, while allowing an easy stripping of the absorbed $SO_2$. Further, the ionic liquid absorbent of the present invention shows excellent performance characteristics in reversible absorption of $SO_2$.

The following Examples are intended to further illustrate the present invention without limiting its scope.

Example 1

Preparation of Sulfur Dioxide Absorbent

1-Methylimidazole (0.1 mol) and 30 mL of benzene as a solvent were loaded into a 100 mL reactor, triethylene glycol monomethyl ether methanesulfonate (0.1 mol) was added thereto dropwise, the resulting mixture was subjected to a reaction at 90° C. for 12 hours, and then the ionic liquid in the lower layer was recovered by a layer separation.

A small amount of benzene in the recovered ionic liquid layer was removed using a rotary evaporator to obtain 1-triethylene glycol monomethyl ether-3-methylimidazolium methanesulfonate ($[E_3GMEMIm]MeSO_3$) (yield: 99%, purity: 97%).

Examples 2 to 6 and Comparative Example 1

Preparation of Sulfur Dioxide Absorbent

The procedure of Example 1 was repeated using an alkyl ether alkanesulfonate shown in Table 1 instead of triethylene glycol monomethyl ether methanesulfonate, to obtain a desired ionic liquid.

TABLE 1

| | Alkyl ether alkanesulfonate | $SO_2$ Absorbent |
|---|---|---|
| Example 2 | Ethylene glycol monomethyl ether methanesulfonate | $[EGMEMIm]MeSO_3$ |
| Example 3 | Diethylene glycol monomethyl ether methanesulfonate | $[E_2GMEMIm]MeSO_3$ |
| Example 4 | Tetraethylene glycol monomethyl ether methanesulfonate | $[E_4GMEMIm]MeSO_3$ |
| Example 5 | Hexaethylene glycol monomethyl ether methanesulfonate | $[E_6GMEMIm]MeSO_3$ |
| Example 6 | Octaethylene glycol monomethyl ether methanesulfonate | $[E_8GMEMIm]MeSO_3$ |
| Comparative Example 1 | 1-Ethyl-3-methyl methanesulfonate | $[EMIm]MeSO_3$ |

$[EGMEMIm]MeSO_3$: 1-Ethylene glycol monomethyl ether-3-methylimidazolium methanesulfonate
$[E_2GMEMIm]MeSO_3$: 1-Diethylene glycol monomethyl ether-3-methylimidazolium methanesulfonate
$[E_4GMEMIm]MeSO_3$: 1-Tetraethylene glycol monomethyl ether-3-methylimidazolium methanesulfonate
$[E_6GMEMIm]MeSO_3$: 1-Hexaethylene glycol monomethyl ether-3-methylimidazolium methanesulfonate
$[E_8GMEMIm]MeSO_3$: 1-Octaethylene glycol monomethyl ether-3-methylimidazolium methanesulfonate
$[EMIm]MeSO_3$: 1-Ethyl-3-methyl imidazolium methanesulfonate Test 1

In order to evaluate the effect of the cation of the absorbent on the $SO_2$ absorption, various ionic liquid absorbents bearing a methanesulfonate anion ($MeSO_3^-$) were tested for the $SO_2$ absorption.

A 50 mL stainless steel absorption reactor (R1) as shown in FIG. 1 was filled with 10 g of the ionic liquid absorbent obtained in Example 1, i.e., 1-triethylene glycol monomethyl ether-3-methylimidazolium methanesulfonate ([E$_3$GMEMIm]MeSO$_3$), and then the SO$_2$ absorption capacity was tested in an isothermal oven at 30° C. First, a storage cylinder (S2) was filled with SO$_2$ to a pressure of 3.5 atm, the valve (V4) was opened so that the absorption reactor (R1) was filled with SO$_2$ to a pressure of 1 atm, and then stirred. Until an absorption equilibrium reached, a decrease in the pressure of the storage cylinder (S2) was measured, and then the amount of SO$_2$ dissolved in the ionic liquid was calculated using the ideal gas equation.

The ionic liquids obtained in Examples 2 to 6 and Comparative Example 1 were tested by the same method as described above, and the results are summarized in Table 2.

TABLE 2

| | SO$_2$ absorbent (IL) | SO$_2$ absorbed (gmole SO$_2$/gmole IL) |
|---|---|---|
| Example 1 | [E$_3$GMEMIm]MeSO$_3$ | 2.35 |
| Example 2 | [E$_1$GMEMIm]MeSO$_3$ | 2.05 |
| Example 3 | [E$_2$GEMMIm]MeSO$_3$ | 2.15 |
| Example 4 | [E$_4$GEMMIm]MeSO$_3$ | 2.64 |
| Example 5 | [E$_6$GEMMIm]MeSO$_3$ | 3.12 |
| Example 6 | [E$_8$GEMMIm]MeSO$_3$ | 3.43 |
| Comparative Example 1 | [EMIm]MeSO$_3$ | 1.88 |

As shown in Table 2, the absorbed amount of SO$_2$ increased as the number of ether groups in cation of the absorbent increases. This shows that SO$_2$ interacts not only with sulfonate group in the anion but also with ether groups on the cation, i.e., oxygen atom, thereby increasing the SO$_2$ absorption capacity.

Test 2

In order to determine the change of SO$_2$ absorption with absorption temperature, SO$_2$ absorption reaction was conducted at temperatures ranging from 20 to 60° C. using [E$_3$GMEMIm]MeSO$_3$ in Example 1 as the absorbent. The absorption procedure was the same as in Test 1 and the results are shown in Table 3 below.

TABLE 3

| Absorption Temp. (° C.) | SO$_2$ absorbed (gmole SO$_2$/gmole IL) |
|---|---|
| 20 | 2.65 |
| 40 | 2.24 |
| 50 | 1.97 |
| 60 | 1.82 |

As shown in Table 3, the amount of absorbed SO$_2$ decreased as the absorption temperature increase. This is because the absorption of SO$_2$ in the absorbent and the stripping of SO$_2$ from the absorbent occur at the same time at a high temperature.

Test 3

In order to see the effect of SO$_2$ absorption on the absorption pressure, the SO$_2$ absorption was performed at pressures ranging from 0.5 to 3 atm using [E$_3$GMEMIm]MeSO$_3$ obtained in Example 1 as the SO$_2$ absorbent. The absorption procedure was the same as in Test 1 and the results are shown in Table 4 below.

TABLE 4

| Absorption Pressure (atm) | SO$_2$ absorbed (gmole SO$_2$/gmole IL) |
|---|---|
| 0.5 | 1.95 |
| 1.5 | 2.54 |
| 2.0 | 2.77 |
| 2.5 | 2.98 |
| 3.0 | 3.22 |

As shown in Table 4, the amount of absorbed SO$_2$ increased as the absorption pressure increase. This implies that sulfur dioxide was absorbed in the absorbent through physical interactions.

Test 4

SO$_2$ absorption experiments were performed using the SO$_2$ absorbents obtained in Examples 1 to 3, according to the procedure employed in Test 1.

After the first absorption was conducted, the absorbed amount of SO$_2$ was measured, the pressure was reduced to atmospheric pressure by opening the valve (V5), and then SO$_2$-stripping was conducted at 100° C. N$_2$ flow rate during the stripping was set to 10 mL/min. The cycle of absorption and stripping was repeated 5 times under the same condition, and the absorbed amounts of SO$_2$ were measured at the 1st and 5th cycles, which are shown in Table 5.

As Comparative Examples 2 to 4, conventional SO$_2$ absorbents comprising ionic liquids, i.e., 1-ethyl-3-methyl imidazolium ethylsulfate ([EMIm]EtSO$_4$), 1,1,3,3-tetramethylguanidinium lactate ([TMG]L) and 1-butyl-3-hexafluoropropyl imidazolium trifluoroacetate ([BhFpIm]CF$_3$CO$_2$) were used, respectively.

TABLE 5

| | | SO$_2$ Absorbed (gmole SO$_2$/gmole IL) | |
|---|---|---|---|
| | SO$_2$ Absorbent (IL) | 1st Absorption | 5th Absorption |
| Example 1 | [E$_3$GMEMIm]MeSO$_3$ | 2.35 | 2.33 |
| Example 2 | [E$_1$GMEMIm]MeSO$_3$ | 2.05 | 2.04 |
| Example 3 | [E$_2$GEMMIm]MeSO$_3$ | 2.15 | 2.12 |
| Comparative Example 2 | [EMIm]EtSO$_4$ | 1.05 | 0.92 |
| Comparative Example 3 | [TMG]L | 1.68 | 1.22 |
| Comparative Example 4 | [BhFpIm]CF$_3$CO$_2$ | 0.53 | 0.37 |

As shown in Table 5, the sulfur dioxide absorbents of the present invention were able to maintain a relatively constant absorption capacity despite repeated recycles while the conventional sulfur dioxide absorbents showed a substantial reduction in absorption capacity after 5 recycles, i.e., 12% for [EMIm]EtSO$_4$, 27% for [TMG]L, and 30% for [BhFpIm]CF$_3$CO$_2$.

While the invention has been described with respect to the above specific embodiments, it should be recognized that various modifications and changes may be made to the invention by those skilled in the art which also fall within the scope of the invention as defined by the appended claims.

What is claimed is:

1. A sulfur dioxide absorbent comprising an ionic liquid of formula (I):

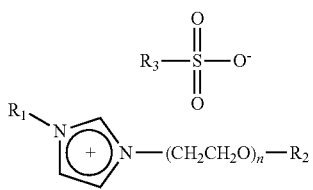

wherein $R_1$ to $R_3$ are each independently $C_{1-8}$ alkyl, and n is an integer ranging from 1 to 8.

2. The sulfur dioxide absorbent of claim 1, wherein said $R_1$ to $R_3$ of formula (I) are each independently $C_{1-4}$ alkyl.

3. The sulfur dioxide absorbent of claim 1, wherein the ionic liquid is selected from the group consisting of:
1-triethylene glycol monomethyl ether-3-methylimidazolium methanesulfonate;
1-ethylene glycol monomethyl ether-3-methylimidazolium methanesulfonate;
1-diethylene glycol monomethyl ether-3-methylimidazolium methanesulfonate;
1-tetraethylene glycol monomethyl ether-3-methylimidazolium methane sulfonate;
1-hexaethylene glycol mono methyl ether-3-methylimidazolium methanesulfonate;
1-octaethylene glycol mono methyl ether-3-methylimidazolium methanesulfonate; and
a mixture thereof.

4. A method for separating and recovering sulfur dioxide, comprising the steps of:
(a) contacting a gaseous mixture containing $SO_2$ to the sulfur dioxide absorbent of claim 1 so as to selectively absorb said $SO_2$ from the gaseous mixture; and
(b) stripping said $SO_2$ absorbed in the sulfur dioxide absorbent by a thermal treatment.

5. The method of claim 4, wherein the absorption of said $SO_2$ is conducted at a temperature of 20 to 80° C.

6. The method of claim 4, wherein the absorption of said $SO_2$ is conducted under a pressure of 0 to 5 atm.

7. The method of claim 4, wherein the stripping of said $SO_2$ is conducted at a temperature of 50 to 150° C.

* * * * *